UNITED STATES PATENT OFFICE.

WALTER O. SNELLING, OF ALLENTOWN, PENNSYLVANIA.

VULCANIZED-OIL PRODUCT.

1,376,173.     Specification of Letters Patent.     Patented Apr. 26, 1921.

No Drawing. Original application filed May 22, 1915, Serial No. 29,765. Divided and this application filed August 8, 1919. Serial No. 316,024.

*To all whom it may concern:*

Be it known that I, WALTER O. SNELLING, a citizen of the United States, residing at Allentown, in the county of Lehigh and State of Pennsylvania, have invented certain Improvements in Vulcanized-Oil Products, (being a division of application S. N. 29,765, filed May 22, 1915,) of which the following is a specification.

The general object of my invention is the preparation of cohesive and plastic masses possessing certain of the general properties of rubber, and capable of being used in part as a substitute thereof, and in part as compounding ingredients, capable when mixed with other substances such as resins, rubber, gutta percha, and like materials, of yielding products having advantageous properties which by vulcanization or other appropriate treatment may be still further modified and changed to yield products having desirable properties of cohesiveness, toughness, elasticity and plasticity.

In my application above referred to, of which this is a division, I have disclosed methods of producing rubber-like products by vulcanizing a vegetable oil under conditions which permit of the later transformation of the original vulcanized product into a tough, cohesive and plastic product, and I have also disclosed a method by which related vulcanized oil products of fluid nature and unique properties may be prepared.

The object of my present application is to specifically claim the liquid vulcanized oil products described, but not specifically claimed in my original application, and also to specifically claim the products obtained by mixing together or compounding my new vulcanized oil products with other substances, or by compounding two or more of my new vulcanized oil products, to produce mixtures or compounds of desired cohesiveness, toughness, elasticity or plasticity.

By suitable modifications of my process of treating oils as already previously described, I can obtain liquid vulcanized oil products, semi-liquid vulcanized oil products, non-liquid but plastic vulcanized oil products, and tough, non-liquid and non-plastic vulcanized oil products. In short, by suitable modifications of my process I can obtain vulcanized oil products having any desired plasticity from a thin and mobile liquid to a hard, tough product resembling ordinary vulcanite, all of these modifications being produced by suitably controlling the polymerizing and depolymerizing steps in the treatment of the original oil.

Each of the bodies produced as described possesses a series of properties which however, are mutually dependent. Thus for example, the product produced in the manner described and possessing a certain prescribed degree of plasticity will show a certain degree of toughness, and the toughness and the plasticity will be interrelated and dependent factors, and it will not be possible to modify one of these factors without the other factor automatically being modified to approximately a corresponding extent.

For certain uses it may be desirable to produce products having the same elasticity as certain of my normal vulcanized oil products, but possessing at the same time a greater or a less degree of toughness than is normally associated with that particular vulcanized product. I have found that I can produce this result by compounding two or more bodies, at least one of which is a vulcanized oil product produced in the manner fully described in my original application.

By compounding one of my liquid vulcanized oil products with a tough and non-liquid vulcanized oil product I obtain a substance different from either of the components used, and by preparing a series of vulcanized oil products having different degrees of plasticity, toughness, elasticity, or other physical characteristics, and then compounding these bodies with other materials such as resins, caoutchouc, gutta percha or like bodies, I can obtain almost any desired properties in my resulting product. Just as in the manufacture of glass it is possible to modify the refractive index to a different extent than the other optical properties of the glass, so that composite lenses may be produced which have almost any desired optical properties, so by suitably compounding my vulcanized oil products for the purpose of maintaining one particular property constant while modifying some other property, I have found it possible to prepare products having most unique properties, and possessing for example, exceptional elasticity and toughness, or other like pairs of desirable properties.

Starting with my liquid vulcanized oil product, the particles of which show strong internal attraction sufficient to give the material a high degree of cohesiveness in spite of its liquid nature, and compounding with this material varying amounts of solid vulcanized oil products possessing to any desired extent any single characteristic such as toughness or elasticity, I obtain a series of products of which the liquid vulcanized oil product represents one end, and the solid vulcanized oil product represents the other end, with the intermediate bodies showing intermediate properties roughly in proportion to the percentages of the two products compounded. Instead of employing a liquid vulcanized oil product as a compounding ingredient to increase the plasticity of a tougher and less plastic material, it is of course evident that I may use a plastic but solid vulcanized oil product, or a mixture of several vulcanized oil products of different physical characteristics. I have found that my liquid vulcanized oil products, when mixed with ordinary caoutchouc, give bodies which have superior properties for use in picking up gold leaf in bookbinding work and other like purposes requiring a soft, very plastic and kneadable body possessing strong adhesive properties, while certain of my solid but very tough plastic vulcanized oil products form compounding ingredients for ordinary rubber in the production of extremely tough and elastic products which resist the action of oils much better than ordinary grades of rubber.

By heat treatment, either with or without the addition of a vulcanizing agent or other chemical body the characteristics of my vulcanized oil products and compounds containing them may be still further modified with a corresponding increase in the number of characteristics of the finished product which may be controlled by predetermined treatment.

From the foregoing statement it will be evident that the range of modifications which may be effected in my process is very great. My invention should therefore not be considered as being limited to the specific illustrations given, but should be understood to cover all equivalents of the materials and methods that have been specifically mentioned, and no limitations are to be imposed upon my invention except such as are indicated in the appended claims.

I claim as my invention:

1. A light-colored liquid vulcanized oil product.

2. A vulcanized oil product comprising liquid vulcanized oil compounded with a solid vulcanized oil.

3. The process that comprises imparting different degrees of plasticity to a plurality of portions of vulcanized oil and mixing the resulting products.

In testimony whereof I have hereunto subscribed my name this 7th day of August, 1919.

WALTER O. SNELLING.